(12) United States Patent
Meyer et al.

(10) Patent No.: US 11,161,938 B2
(45) Date of Patent: Nov. 2, 2021

(54) PRODUCTION OF SILOXANE-CONTAINING BLOCK COPOLYCARBONATES BY MEANS OF COMPATIBILIZERS

(71) Applicant: Covestro Deutschland AG, Leverkusen (DE)

(72) Inventors: Alexander Meyer, Düsseldorf (DE); Klaus Horn, Dormagen (DE); John Huggins, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 62 days.

(21) Appl. No.: 16/470,653

(22) PCT Filed: Dec. 19, 2017

(86) PCT No.: PCT/EP2017/083465
§ 371 (c)(1),
(2) Date: Jun. 18, 2019

(87) PCT Pub. No.: WO2018/114901
PCT Pub. Date: Jun. 28, 2018

(65) Prior Publication Data
US 2020/0017640 A1    Jan. 16, 2020

(30) Foreign Application Priority Data

Dec. 19, 2016    (EP) .................... 16205062

(51) Int. Cl.
| | | |
|---|---|---|
| C08L 69/00 | (2006.01) | |
| C08G 64/18 | (2006.01) | |
| C08G 77/448 | (2006.01) | |
| C08G 77/06 | (2006.01) | |
| C08L 83/04 | (2006.01) | |
| C08G 77/16 | (2006.01) | |

(52) U.S. Cl.
CPC ......... *C08G 77/448* (2013.01); *C08G 64/186* (2013.01); *C08G 77/06* (2013.01); *C08L 69/00* (2013.01); *C08L 83/04* (2013.01); C08G 77/16 (2013.01)

(58) Field of Classification Search
None
See application file for complete search history.

(56) References Cited

U.S. PATENT DOCUMENTS

| | | | |
|---|---|---|---|
| 3,189,662 A | 6/1965 | Vaughn, Jr. | |
| 3,419,634 A | 12/1968 | Vaughn, Jr. | |
| 3,751,519 A * | 8/1973 | Bostick ............. | C08K 5/549 524/266 |
| 4,390,651 A * | 6/1983 | Brown, Jr. ........ | C08G 77/04 524/267 |
| 4,584,360 A | 4/1986 | Paul et al. | |
| 4,950,081 A | 8/1990 | List | |
| 5,227,449 A | 7/1993 | Odell et al. | |
| 5,288,778 A | 2/1994 | Schmitter et al. | |
| 5,334,358 A | 8/1994 | Schuchardt et al. | |
| 5,344,908 A | 9/1994 | Rosenquist | |
| 5,399,012 A | 3/1995 | Schuchardt et al. | |
| 5,407,266 A | 4/1995 | Dötsch et al. | |
| 5,414,054 A | 5/1995 | Jonsson et al. | |
| 5,504,177 A | 4/1996 | King, Jr. et al. | |
| 5,505,536 A | 4/1996 | Schuchardt | |
| 5,530,083 A | 6/1996 | Phelps et al. | |
| 5,658,075 A | 8/1997 | Schebesta et al. | |
| 5,669,710 A | 9/1997 | Schebesta et al. | |
| 5,783,651 A | 7/1998 | König et al. | |
| 5,821,321 A | 10/1998 | Archey et al. | |
| 5,821,380 A | 10/1998 | Holderbaum et al. | |
| 5,876,115 A | 3/1999 | Schebesta et al. | |
| 5,883,165 A | 3/1999 | Kröhnke et al. | |
| 6,066,700 A | 5/2000 | König et al. | |
| 6,892,723 B2 | 5/2005 | Anschütz et al. | |
| 8,044,122 B2 | 10/2011 | Ruediger et al. | |
| 8,158,745 B2 | 4/2012 | Wehrmann et al. | |
| 8,912,290 B2 | 12/2014 | Huggins et al. | |
| 2005/0024987 A1 | 2/2005 | Kunz et al. | |
| 2007/0238846 A1 | 10/2007 | Davis et al. | |

(Continued)

FOREIGN PATENT DOCUMENTS

| | | |
|---|---|---|
| DE | 3334782 A1 | 10/1984 |
| DE | 19523000 A1 | 1/1996 |
| DE | 19710081 A1 | 9/1998 |
| DE | 10311063 A1 | 9/2004 |
| DE | 102007011069 A1 | 9/2008 |
| DE | 102008019503 A1 | 10/2009 |
| EP | 0122535 A2 | 10/1984 |
| EP | 222599 A2 | 5/1987 |
| EP | 329092 A1 | 8/1989 |
| EP | 460466 A1 | 12/1991 |
| EP | 0500496 A1 | 8/1992 |
| EP | 517068 A1 | 12/1992 |

(Continued)

OTHER PUBLICATIONS

International Search Report for PCT/EP2017/083465 dated Feb. 12, 2018.

(Continued)

*Primary Examiner* — David J Buttner

(74) *Attorney, Agent, or Firm* — Faegre Drinker Biddle & Reath LLP

(57) ABSTRACT

The subject of the present invention is a process for the production of polysiloxane-polycarbonate block cocondensates, wherein A) at least one polycarbonate is reacted in the melt with B) at least one hydroxyaryl-terminated polysiloxane with use C) of an additive which is selected from at least one from the group consisting of a siloxane containing aromatic substituents (component C1) and a polysiloxane-polycarbonate block cocondensate A) or polysiloxane-polycarbonate block cocondensate, which can also be different from A) (component C2).

12 Claims, 1 Drawing Sheet

(56) References Cited

U.S. PATENT DOCUMENTS

2012/0251750 A1* 10/2012 Sybert ............... C08L 69/00
428/35.7
2018/0079862 A1   3/2018 Meyer et al.

FOREIGN PATENT DOCUMENTS

| EP | 528210 | A1 | 2/1993 |
| EP | 638354 | A1 | 2/1995 |
| EP | 715881 | A2 | 6/1996 |
| EP | 715882 | A2 | 6/1996 |
| EP | 770636 | A2 | 5/1997 |
| EP | 798093 | A2 | 10/1997 |
| EP | 0839623 | A1 | 5/1998 |
| EP | 1308084 | A1 | 5/2003 |
| EP | 1436073 | A1 | 7/2004 |
| WO | WO-9615102 | A2 | 5/1996 |
| WO | WO-20021114 | A1 | 1/2002 |
| WO | WO-03035235 | A1 | 5/2003 |
| WO | WO-2004016674 | A1 | 2/2004 |
| WO | WO-2015052110 | A1 | 4/2015 |
| WO | WO-2015052229 | A1 | 4/2015 |
| WO | WO-2016162301 | A1 | 10/2016 |

OTHER PUBLICATIONS

Written Opinion of the International Searching Authority for PCT/EP2017/083465 dated Feb. 12, 2018.

* cited by examiner

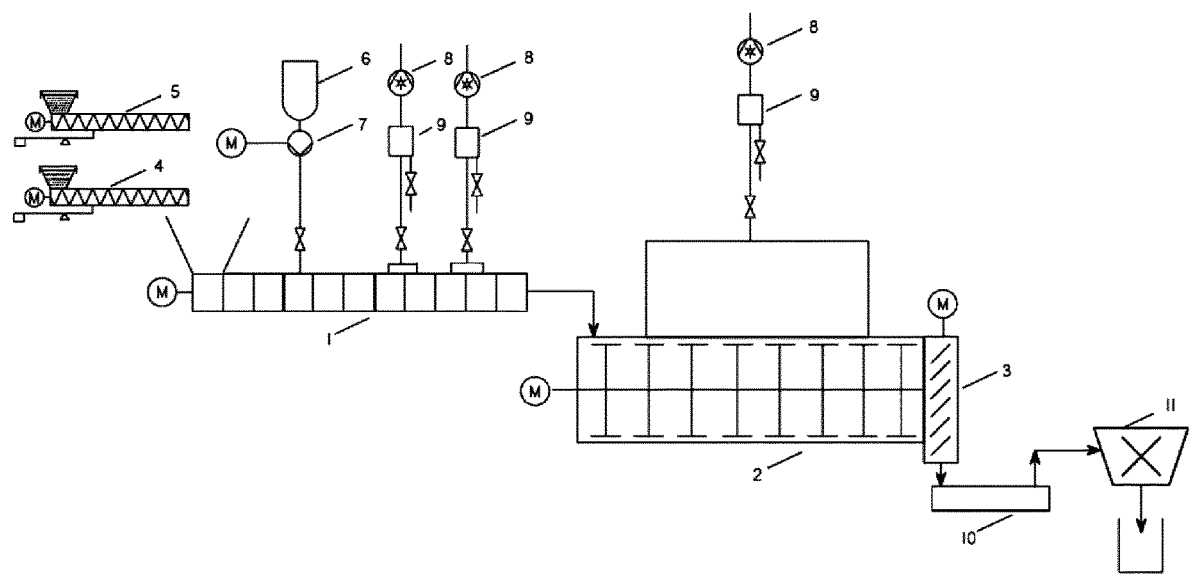

PRODUCTION OF SILOXANE-CONTAINING BLOCK COPOLYCARBONATES BY MEANS OF COMPATIBILIZERS

CROSS-REFERENCE TO RELATED APPLICATIONS

This application is a national stage application (under 35 U.S.C. § 371) of PCT/EP2017/083465, filed Dec. 19, 2017, which claims benefit of European Application No. 16205062.9, filed Dec. 19, 2016, both of which are incorporated herein by reference in their entirety.

The present invention relates to a process for the production of polysiloxane-polycarbonate block cocondensates (also referred to below as SiCoPC) starting from specific polycarbonates and hydroxyaryl-terminated polysiloxanes. In particular, the present invention relates to the production of the said block cocondensates by means of a reactive extrusion. The polysiloxane block cocondensates according to the invention have a fine polysiloxane domain distribution and are characterized by good mechanical properties and good melt stability.

It is known that polysiloxane-polycarbonate block cocondensates have good properties as regards low temperature impact resistance or low temperature notch impact resistance, chemicals resistance and outdoor weather resistance and ageing properties and flame resistance. In these properties, they are to some extent superior to the conventional polycarbonates (bisphenol-A based homopolycarbonate).

These cocondensates are produced industrially from the monomers mostly via the phase interface process with phosgene. Further, the production of these siloxane cocondensates via the melt transesterification process with use of diphenyl carbonate is known. These processes have the disadvantage that the industrial plants used for this are used for the production of standard polycarbonate and therefore have a large plant size. The production of special block cocondensates on these plants is often not economically reasonable because of the lower volume of these products. Further, the starting materials required for the production of the cocondensates, such as for example the polydimethylsiloxanes, can adversely affect the plant since they can lead to contamination of the plant or of the solvent circuits. Besides this, starting materials such as phosgene are required for the production process or require high energy consumption as in the transesterification process.

The production of polysiloxane-polycarbonate block copolymers via the phase boundary process is known in the literature and for example described in U.S. Pat. Nos. 3,189,662, 3,419,634, DE-OS 3 34 782 (LeA 22 594) and EP 0 122 535.

The production of polysiloxane carbonate block copolymers by the melt transesterification process from bisphenol, diaryl carbonate, silanol end-terminated polysiloxanes and catalyst is described in U.S. Pat. No. 5,227,449. As siloxane compounds here, polydiphenyl- or polydimethylsiloxane telomers with silanol end groups are used. However, it is known that such dimethylsiloxanes with silanol end groups, in contrast to diphenylsiloxane with silanol end groups, in an acidic or basic medium increasingly tend to self-condensation with decreasing chain length, so that incorporation into the resulting copolymer is thereby rendered difficult. Cyclic siloxanes thus formed remain in the polymer and have an extremely adverse effect in applications in the electrical electronics field.

In U.S. Pat. No. 5,504,177, the production of a block copolysiloxane carbonate via melt transesterification from a carbonate-terminated silicone with bisphenol and diaryl carbonate is described. Because of the great incompatibility of the siloxanes with bisphenol and diaryl carbonate, uniform incorporation of the siloxanes into the polycarbonate matrix via the melt transesterification process can only be achieved with great difficulty or not at all. Furthermore, the production of the block cocondensates starting from the monomers is very costly.

In EP 770636, a melt transesterification process for the production of block copolysiloxane carbonates starting from bisphenol A and diaryl carbonate with use of special catalysts is described. A disadvantage in this process also is the costly synthesis of the copolymer starting from the monomers.

In U.S. Pat. No. 5,344,908, the preparation of a silicone-polycarbonate block copolymer by a two-stage process is described, in which an OH-terminated BPA oligocarbonate produced via a melt transesterification process is reacted with a chlorine-terminated polyorganosiloxane in presence of an organic solvent and an acid scavenger. Such two-stage processes are also very costly and to be performed only with difficulty in large industrial plants.

A disadvantage in all these processes is the use of organic solvents in at least one step of the synthesis of the silicone-polycarbonate block copolymers or the use of phosgene as starting material or the unsatisfactory quality of the cocondensate. In particular, the synthesis of the cocondensates starting from the monomers is very costly both in the phase boundary process and also above all in the melt transesterification process. Thus for example in melt processes a low vacuum and low temperatures must be used in order to prevent evaporation and hence removal of the monomers. Only in later reaction stages, in which oligomers of higher molecular mass have formed, can lower pressures and higher temperatures be used. This means that the reaction must be conducted over several stages, and the reaction times are thus correspondingly long.

In order to avoid the disadvantages described above, reactive extrusion processes for the production of siloxane-based block copolycarbonates have also been described. This has for example been published in U.S. Pat. Nos. 5,414,054 and 5,821,321. Here a conventional polycarbonate is reacted with a special polydimethylsiloxane in a reactive extrusion process. A disadvantage in this process, however, is the use of special silicone components which are expensive. Further, in this process highly effective transesterification catalysts are used, which enable the production of the cocondensates within short residence times on an extruder. However, these transesterification catalysts remain in the product and can be inactivated only insufficiently or not at all. Consequently, bodies injection moulded from the cocondensates thus produced have unsatisfactory ageing behaviour, in particular unsatisfactory thermal ageing behaviour. Hence the resulting block copolycarbonate is not suitable for high quality applications. In comparison to a block copolycarbonate from the phase boundary process, this product does not display the corresponding properties, such as ageing behaviour and mechanical properties.

In DE 19710081, a process for the production of the said cocondensates in a melt transesterification process starting from an oligocarbonate and a special hydroxyarylsiloxane is described. The production of the oligocarbonate is also described in this application. However, the large-scale industrial preparation of oligocarbonates for the production of relatively low-volume special cocondensates is very costly. These oligocarbonates have relatively low molecular weights and relatively high OH end group concentrations.

Often these oligocarbonates because of their low chain length have phenolic OH concentrations of over 1000 ppm. Such products are normally not commercially available and would therefore have to be produced especially for the production of the cocondensates. However, it is not economical to operate large industrial plants with the production of low-volume precursors. Further, because of the impurities contained in these products, such as for example residual solvent, residual catalysts, unreacted monomers etc., such precursors are markedly more reactive than normal commercial high molecular weight polycarbonate-based products. For these reasons, appropriate precursors or aromatic oligocarbonates which are suitable for the production of such block cocondensates are not commercially available. Further, the process presented in DE 19710081 does not allow the production of the block cocondensate in short reaction times. Both the production of the oligocarbonate and also the production of the block cocondensate takes place over several stages with residence times of markedly over one hour overall. Furthermore, the resulting material is not suitable for the production of cocondensates, since the high concentration of OH end groups and other impurities, such as for example catalyst residue components, result in poor colour in the end product.

A further problem in the production of siloxane-containing block cocondensates by the melt transesterification process starting from polycarbonates and polydimethylsiloxanes is the high concentration of the reactants in the reaction mixture. In contrast to this, the concentration of the reactants in the phase boundary process is low, since here the operation is in solution and moreover it starts from the monomers, i.e. from a bisphenol. The bisphenol is thus condensed with the siloxane block in dilute solution. This has the result that the domain size in the melt transesterification process—if one starts from oligo- or polycarbonates—comes out markedly greater than in comparison with a process in which the operation is in dilute solution and in which it starts from the monomers. As a result, with corresponding materials which are produced in the melt transesterification process surface defects often arise. These surface defects are a direct result of the high domain size.

In the phase boundary process, the domain size typically lies below 100 nm. As a result, translucent or even transparent materials can be obtained, since because of the low domain size hardly any light scattering now occurs.

The production of siloxane-containing block cocondensates with a low haze level is in principle known. In WO 2004016674, a precondensate is produced from an oligocarbonate and siloxane in the phase boundary process and then in a second step further condensed with a bisphenol in the phase boundary process.

It is in principle known that by means of additives such as compatibilizers the domain size of the siloxane domains in the block cocondensate can be lowered. However, the addition of phase boundary active substances such as are for example described in DE19523000 described cannot be used in the process according to the invention since the associated high temperatures and relatively long residence times in the melt transesterification are not compatible. Other compatibilizers, mostly on account of the high temperatures, can also not be used, since they are degraded or result in a product with poor melt stability.

US20070238846 describes haze-free siloxane block cocondensates starting from siloxane blocks with particularly low molecular weight. These block cocondensates are also produced in the phase boundary process.

The melt transesterification process has the disadvantage that in principle it is not possible to work in dilution and the reactants are always present very concentrated. According to experience, this results in the formation of siloxane domains of size between 0.1 and 10 µm.

A high domain size has an adverse effect on the processing properties. As a result of large domains, segregations can occur, which can manifest themselves by inhomogeneous surface structure and sometimes results in flow marks and streaking. Since large domains are shear-sensitive, such materials are also difficult to process in injection moulding, so that only very small processing windows are possible. Thus it is sometimes necessary to work with very low injection speeds, which is often undesired since it lowers the cycle time.

In melt transesterification processes and in particular in so-called reactive extrusion processes, there is in principle the danger that catalysts remain in the end product, which can lead to molecular weight degradation during subsequent processing, such as for example in injection moulding. This can manifest itself through surface defects and generally through poor processing properties.

Therefore, starting from the prior art described, the objective therefore existed of developing a process which provides siloxane-containing block cocondensates of small domain size, which at the same time have high melt stability. In the process, an alternative process to the phase boundary process should be developed, which can make available block cocondensates of lower domain. Further, the objective existed of developing a melt transesterification process which yields siloxane domains as small as possible, starting from conventional polycarbonates.

As a result, the domain size should reach a D90 value of less than 160 nm, preferably less than 150 nm, and especially preferably less than/equal to 135 nm. The content of particles with a diameter less than 100 nm should preferably be greater than 74%, especially preferably greater than 80% based on the total number of the siloxane domains.

Surprisingly, it could be shown that through addition of a polysiloxane containing aromatic substituents or a polysiloxane-polycarbonate block cocondensate or mixtures thereof to the reaction melt, the domain size of polysiloxane-polycarbonate block cocondensates could be decreased. In the process, surprisingly, SiCoPCs with high melt stability were obtained.

A subject of the present invention is therefore a process for the production of polysiloxane-polycarbonate block cocondensates, in which A) at least one polycarbonate is reacted in the melt with
B) at least one hydroxyaryl-terminated polysiloxane with use
C) of an additive which is selected from at least one from the group consisting of a siloxane containing aromatic substituents (component C1) and a polysiloxane-polycarbonate block cocondensate A) or polysiloxane-polycarbonate block cocondensate, which can also be different from A) (component C2). Preferably, in this process C) is an additive which is selected from at least one from the group consisting of a siloxane containing aromatic substituents (component C1) and a polysiloxane-polycarbonate block cocondensate which is obtained from the reaction of at least component A) and B) or polysiloxane-polycarbonate block cocondensate, which can also be different from the product obtained from the reaction of at least component A) and B) (component C2).

According to the present invention, the term "additive" is to be understood that component C) is added as an additive in a separate process step of addition. This means that embodiments where component C2 is formed in situ by and during the reaction of A) and B) are excluded. According to the present invention an active step of adding component C) is necessary. Preferably, according to the present invention a process is provided, wherein the process comprises the step of adding component C) to component A), to component B) and/or to a mixture of component A) and B). As mentioned before this process step is an active step and does not comprise the case where C) is built in situ by reaction of A) and B).

Preferably, when the process of the present invention comprises the step of adding component C) to a mixture of component A) and B), component A) and B) have not reacted with each other so far. This means that preferably the addition of component C) to the mixture of component A) and B) takes place at an early stage of the process. Preferably, this addition takes place immediately after the mixture of component A) and B) is formed. The skilled person is able to essentially avoid the reaction of component A) and B) before the addition of component C). For example, this can be achieved by a lower vacuum and/or low temperatures until the addition of component C). In this context the term "immediately" preferably means that the addition of component C) is performed during the melting process of the polycarbonate (component A)) where appropriate in presence of component B) or directly after the plasticisation.

The production of the SiCoPCs can be effected both in a melt transesterification process and also in a reactive extrusion process. Preferably, polycarbonate A) is reacted with the hydroxyaryl-terminated polysiloxane B) and the additive C) in the melt on an extruder or high-viscosity reactor.

The melt transesterification process and the reactive extrusion process are generally known (e.g. U.S. Pat. Nos. 5,227,449, 5,504,177 and the literature cited above).

The extruder or melt reactor can be a single-shaft reactor, a double-shaft reactor, a planetary roller extruder or ring extruder. Further it can be a polymer kneader of high volume. The reactor combination preferably consists of a pre-reactor and a high-viscosity reactor.

The process is preferably operated at temperatures of 280° C. to 400° C., preferably 300° C. to 390° C., more preferably 320° C. to 380° C. (present in the second reactor, preferably a high-viscosity reactor) and quite especially preferably 30° C. to 370° C. and pressures of 0.001 mbar to 50 mbar, preferably 0.005 mbar to 40 mbar, especially preferably 0.02 to 30 mbar and quite especially preferably 0.03 to 5 mbar (present in the second reactor, preferably a high-viscosity reactor) preferably in presence of a catalyst, which is preferably selected from a metal salt, e.g. a metal salt of organic acids or alcohols or catalysts that are described below. As the pre-reactor a single-shaft or double-shaft extruder, especially preferably a double-shaft extruder, is preferably used. The processing temperature (composition temperature) in the preliminary stage, a so-called pre-reactor is preferably 280° C. to 400° C., preferably 300 to 380° C. and the pressure 300 to 0.01 mbar, preferably 200 to 0.1 mbar.

The reactive extrusion process is preferably performed in an at least two-stage process, wherein the reactor combination preferably consists of a double or single-shaft extruder and a high-viscosity reactor and the low molecular weight cleavage products formed are removed by evaporation in vacuo. On the double or single-shaft extruder, the melting of the polycarbonate takes place, and also the admixture of the further starting materials such as silicone component and optionally catalysts optionally in the form of masterbatches. Further, the mixing and pre-reaction of the components takes place here. The pre-product is then fed into the high-viscosity reactor in which with simultaneous introduction of thermal and mechanical energy it reacts completely in vacuo to give the polycondensation product. The volatile low molecular weight cleavage products and other low molecular weight components can be drawn off both in the pre-reactor (single or double-shaft extruder) after the pre-reactor and/or in the high-viscosity reactor. In a preferred embodiment, low molecular weight components are already removed under vacuum in the pre-reactor. Particularly preferably, this takes place in two vacuum stages, wherein the first vacuum stage is preferably operated at an absolute pressure of 10 to 800 mbar and particularly preferably at an absolute pressure of 50 to 500 mbar, and the second vacuum stage preferably at 0.1 to 100 mbar absolute pressure and particularly preferably at 0.5 to 50 mbar absolute pressure. The reaction in the high-viscosity reactor is also performed under vacuum. The vacuum is 0.001 mbar to 50 mbar, preferably 0.005 mbar to 40 mbar, especially preferably 0.02 to 30 mbar and quite especially preferably 0.03 to 5 mbar absolute.

As the high-viscosity reactor, according to the invention devices are used which are suitable for the processing of highly viscous composition which provide an adequate residence time with good mixing and expose the melt to the vacuum necessary according to the invention. In the patent literature many devices are described which essentially fulfil these requirements and which can be used according to the invention. For example reactors according to EP 460 466, EP 528 210, EP 638 354, EP 715 881, EP 715 882, EP 798 093 can be used, or those according to EP 329 092, according to EP 517 068, EP 1 436 073 or WO 20021114 and those according to EP 222 599.

Preferably, a reactor according to EP 460 466 is used, which cleans itself kinematically and consists of two or more parallel shafts rotating in the same direction, on which are located axially displaced, not necessarily circular plates with strippers distributed on their periphery, and a surrounding housing. This reactor/mixer is characterized in that all surfaces of the stripper are kinematically cleaned, that in particular with shafts rotating at the same speed in any radial section through the mixer all inward-facing surfaces of the stripper of one shaft, if they are cleaned by the housing, are concentric to the centre of rotation, otherwise however have approximately the axial distance as the radius of curvature and are convex and are cleaned by an adjacent shaft or its strippers, that in particular with rotors rotating at equal speed all inward-facing surfaces of the strippers of one shaft in any radial section through the mixer have approximately the axial distance as the radius of curvature and are concave and are cleaned by strippers of another adjacent shaft. For better mixing, the melt can be passed over further mixing elements. For example, a static mixer can be used between the pre-reactor and the high-viscosity reactor.

For the discharge of the fully reacted cocondensates from the high-viscosity reactor, a single-shaft screw, a double-shaft screw or a gear pump is used. Optionally, additives and/or admixtures are further added and blended in. The blending of the admixtures can be effected in the discharge unit or in a downstream static mixer. The melt is shaped via one or more nozzles and broken up with a granulation device according to the prior art.

Through the process according to the invention, the corresponding block cocondensates are obtainable in short reaction times. In this connection, short reaction time means the time which is required to produce the melted starting polycarbonate up to the target viscosity with incorporation of the siloxane component. The reaction time is preferably less than one hour, especially preferably less than 50 minutes and quite especially preferably less than 40 minutes. In a particularly preferred embodiment, the reaction time is less than 30, especially preferably less than 20 minutes.

Preferably, the polycarbonate to be used according to the invention and the siloxane to be used according to the invention is brought to reaction by means of catalysts. Admittedly in principle it is also possible to conduct the reaction without catalyst, however optionally higher temperatures and longer residence times must then be taken into account.

For the process according to the invention, suitable catalysts are for example
Ammonium catalysts, such as for example
Tetramethylammonium hydroxide,
Tetramethylammonium acetate,
Tetramethylammonium fluoride,
Tetramethylammonium tetraphenylboranate,
Dimethyldiphenylammonium hydroxide,
Tetraethylammonium hydroxide,
Cetyltrimethylammonium tetraphenylboranate and
Cetyltrimethylammonium phenolate.

Particularly suitable are phosphonium catalysts of the formula (K):

wherein Ra, Rb, Arc and Rd can be the same or different C1-C10 alkyls, C6-C14 aryls, C7-C15 arylalkyls or C5-C6 cycloalkyls, preferably methyl or C6-C14 aryls, particularly preferably methyl or phenyl, and X— can be an anion such as hydroxide, sulphate, hydrogen sulphate, hydrogen carbonate, carbonate or a halide, preferably chloride or an alkylate or arylate of the formula —OR, wherein R can be a C6-C14 aryl, C7-C15 arylalkyl or C5-C6 cycloalkyl, preferably phenyl.

Particularly preferred catalysts are tetraphenylphosphonium chloride, tetraphenylphosphonium hydroxide and tetraphenylphosphonium phenolate; quite especially preferable is tetraphenylphosphonium phenolate.

The catalyst is preferably used in quantities of 0.0001 to 1.0 wt. % preferably 0.001 to 0.5 wt. %, especially preferably 0.005 to 0.3 wt. % and quite especially preferably 0.01 to 0.15 wt. % based on the whole composition.

The catalyst can be used alone or as a catalyst mixture and be added as substance or as a solution, for example in water or in phenol (e.g. as a solid solution with phenol).

Catalysts suitable for the process according to the invention are the aforesaid, which either can be introduced into the reaction by means of masterbatch with a suitable polycarbonate, in particular the polycarbonate described above, or separately therefrom or further additionally added.

The catalysts can be used alone or in a mixture and be added as substance or as a solution, for example in water or in phenol.

Preferably, the catalyst is added in pure form, as a mixture or in the masterbatch in the pre-reactor preferably on a double-screw extruder.

Component A)

Polycarbonates in the sense of the present invention are both homopolycarbonates and also copolycarbonates and mixtures of polycarbonates. The polycarbonates can in known manner be linear or branched. The production of the polycarbonates can be effected in known manner by the melt transesterification process or the phase boundary process.

For the production of the polysiloxane-polycarbonate block cocondensates according to the invention, polycarbonates with molecular weights from 16,000 to 28,000 g/mol, particularly preferably from 17,000 to 27,000 g/mol and especially preferably from 18,000 to 26,500 g/mol (measured according to BPA standard) are preferably used. These polycarbonates preferably have a content of phenolic OH groups of 250 ppm to 1000 ppm, preferably 300 to 900, and especially preferably 350 to 800 ppm.

Preferably, for the production of the polysiloxane-polycarbonate block cocondensates according to the invention, polycarbonates with molecular weights from 8,000 to 28,000 g/mol, particularly preferably from 10,000 to 27,000 g/mol and especially preferably from 12,000 to 26,500 g/mol are preferably used. These polycarbonates preferably have a content of phenolic OH groups of 250 ppm to 2500 ppm, preferably 500 to 2000, and especially preferably 1000 to 1800 ppm.

These molecular weights as well as all other molecular weights indicated in the present invention are determined according to method No. 2301-0257502-09D of Currenta GmbH & Co. OHG which can be asked for at any time.

Preferred diphenols for the production of the polycarbonates are 4,4'-dihydroxydiphenyl, 2,2-bis-(4-hydroxyphenyl)-1-phenylpropane, 1,1-bis-(4-hydroxyphenyl)phenylethane, 2,2-bis-(4-hydroxyphenyl)-propane, 2,2-bis-(3-methyl-4-hydroxyphenyl)propane, 2,4-bis-(4-hydroxyphenyl)-2-methylbutane, 1,3-bis-[2-(4-hydroxyphenyl)-2-propyl]benzene (bisphenol M), 2,2-bis-(3-methyl-4-hydroxyphenyl)propane, bis-(3,5-dimethyl-4-hydroxyphenyl)methane, 2,2-bis-(3,5-dimethyl-4-hydroxyphenyl)propane, bis-(3,5-dimethyl-4-hydroxyphenyl) sulphone, 2,4-bis-(3,5-dimethyl-4-hydroxyphenyl)-2-methylbutane, 1,3-bis-[2-(3,5-dimethyl-4-hydroxyphenyl)-2-propyl]benzene. 1,1-bis-(4-hydroxyphenyl)cyclohexane and 1,1-bis-(4-hydroxyphenyl)-3,3,5-trimethylcyclohexane.

Particularly preferred diphenols are 2,2-bis-(4-hydroxyphenyl)propane (BPA), hydroquinone, 1,1-bis-(4-hydroxyphenyl)-3,3,5-trimethylcyclohexane and 2,2-bis-(3-methyl-4-hydroxyphenyl)propane.

In particular, polycarbonates based on bisphenol are used. Quite especially preferably, these polycarbonates contain phenol as an end group. Also, polycarbonates which have been produced by the melt transesterification process are especially suitable for the production of the block cocondensates according to the invention.

If the reactive extrusion process is used for the production of the block cocondensates, in a preferred embodiment polycarbonates which contain certain rearrangement structures are used. The polycarbonates to be used in this embodiment contain at least one, preferably several of the following structures (4) to (7):

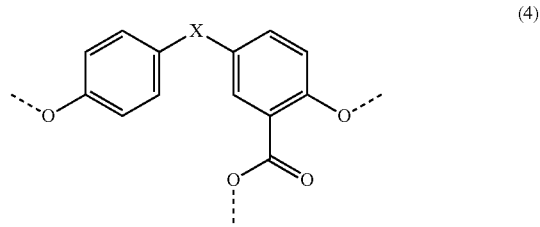

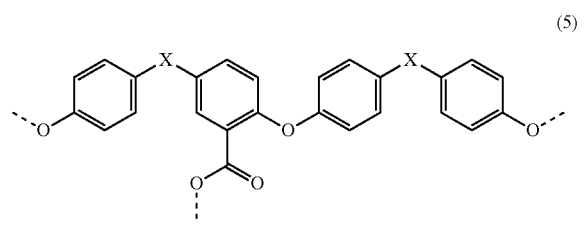
(5)

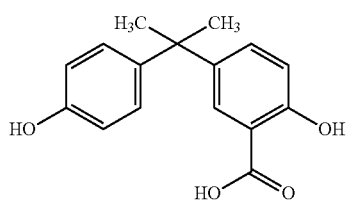
(4a)

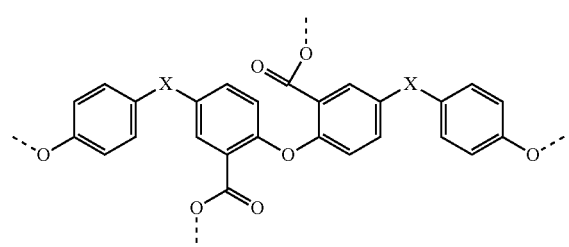
(6)

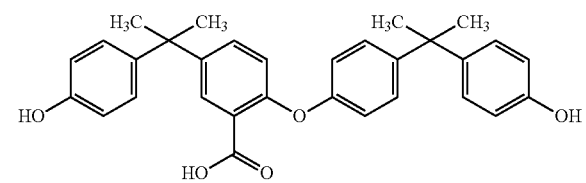
(5a)

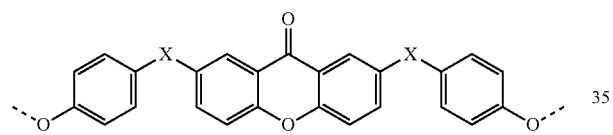
(7)

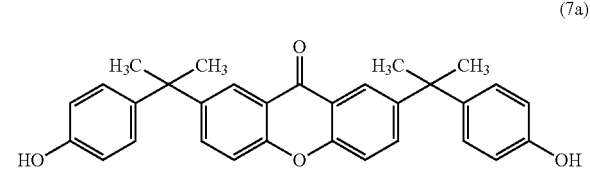
(6a)

in which the phenyl rings mutually independently can be singly or doubly substituted with C1-C8 alkyl, halogen, preferably C1 to C4 alkyl, particularly preferably with methyl and X stand for a single bond, C1 to C6 alkylene, C2 to C5 alkylidene or C5 to C6 cycloalkylidene, preferably for a single bond or C1 to C4 alkylene and especially preferably for isopropylidene, wherein the content of the structural units (4) to (7) in total (determined after hydrolysis) is generally in the range from 50 to 1000 ppm, preferably in the range from 80 to 850 ppm.

Furthermore, polycarbonates which bear phenol as end groups (phenyl-terminated polycarbonate) are preferred. Tert. butylphenol and cumylphenol are further possible end groups.

In order to determine the content of the rearrangement structures, the particular polycarbonate is subjected to a total saponification and thus the corresponding degradation products of the formulae (4a) to (7a) are formed, the content whereof is determined by HPLC (this can for example be done as follows: the polycarbonate sample is saponified with sodium methylate under reflux. The corresponding solution is acidified and concentrated to dryness. The dried residue is dissolved in acetonitrile and the phenolic compounds of the formula (1a) to (4a) determined by HPLC with UV detection):

(7a)

The content of the compound of the formula (4a) thus released is preferably 20 to 800 ppm, particularly preferably 25 to 700 ppm and especially preferably 30 to 500 ppm.

The content of the compound of the formula (5a) thus released is preferably 0 (i.e. below the detection limit of 10 ppm) to 100 ppm, particularly preferably 0 to 80 ppm and especially preferably 0 to 50 ppm.

The content of the compound of the formula (6a) thus released is preferably 0 (i.e. below the detection limit of 10 ppm) to 800 ppm, more preferably 10 to 700 ppm and particularly preferably 20 to 600 ppm and quite especially preferably 30 to 350 ppm.

Preferably is the content of the compound thus released of the formula (7a) 0 (i.e. below the detection limit of 10 ppm) to 300 ppm, preferably 5 to 250 ppm and especially preferably 10 to 200 ppm.

The production of such polycarbonates containing the aforesaid rearrangement structures is for example described in DE 102008019503.

Component B)

Component B is preferably a hydroxyaryl-terminated (poly)siloxane of the formula (1)

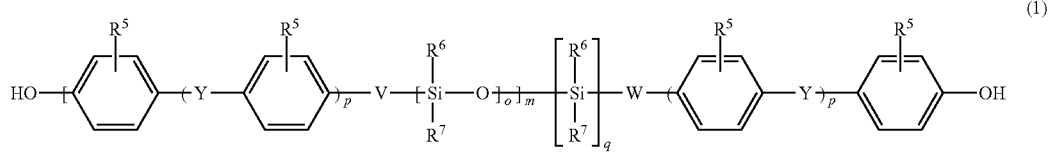

In the general formula (1) $R^5$ stands for hydrogen or C1 to C4 alkyl, C1 to C4 alkoxy, preferably for hydrogen or methyl or methoxy, particularly preferably for hydrogen.

$R^6$ and $R^7$ mutually independently stand for aryl, preferably phenyl, C1 to C4 alkyl, preferably for methyl, in particular for methyl.

Y stands for a single bond, —CO—, —O—, $C_1$ to $C_5$ alkylene, $C_2$ to $C_5$ alkylidene or for a $C_5$ to $C_6$ cycloalkylidene residue, which can be singly or multiply substituted with $C_1$ to $C_4$ alkyl, preferably for a single bond, —O—, isopropylidene or for a $C_5$ to $C_6$ cycloalkylidene residue, which can be singly or multiply substituted with $C_1$ to $C_4$ alkyl, and in particular for isopropylidene.

V stands for oxygen, C1-C6 alkylene or C2 to C5 alkylidene, preferably for oxygen, C3-alkylidene, in particular oxygen.

W stands for a single bond, oxygen, C1 to C6 alkylene or C2 to C5 alkylidene, preferably for a single bond, oxygen, C3 alkylene or isopropylidene, wherein W is not a single bond if q stands for 1 and if q is 0 then W is not oxygen.

p and q mutually independently each stand 0 or 1.

o stands for an average number of repeating units from 10 to 400, preferably 10 to 100, particularly preferably 15 to 50.

m stands for an average number of repeating units from 1 to 10, preferably 1 to 6, particularly preferably 1.5 to 5.

Especially preferable are siloxanes of the formulae (2) and (3)

stands for a single bond, isopropylidene, C5 to C12 cycloalkylidene or oxygen, and quite especially preferably stands for isopropylidene, n means an average number from 10 to 400, preferably 10 and 100, especially preferably 10 to 50 and m stands for an average number from 1 to 10, preferably 1 to 6 and especially preferably from 1.5 to 5.

The molecular weight of the siloxane component is preferably 3,000 to 20,000 g/mol determined using gel permeation chromatography and BPA (bisphenol A)-polycarbonate as standard and especially preferably 3500-15,000 g/mol.

The production of the siloxanes of the formulae (1) to (3) is for example described in DE 33 34 782 A1 and DE 19710081.

The siloxane components of the formula (1), (2) or (3) are used in quantities of 0.5 to 50 wt. %, preferably 1 to 40 wt. %, especially preferably 2 to 20% and quite especially preferably 2.5 to 10 wt. %, each based on the components A) and B).

The production of the siloxane blocks is in principle known and they can be produced by processes as for example described in U.S. Pat. No. 8,912,290.

The siloxane Component B may also comprise in addition 0.02 to 5.0 mmol/kg of a cocatalyst according to WO 2015052229. As co-catalyst organic or inorganic salts of an organic acid having suitably a pKA value within the range of from 3 to 7 (25° C.) are preferred.

Suitable acids include carboxylic acids, preferably C2-C22 carboxylic acids, such as acetic acid, propionic acid, oleic acid, stearic acid, lauric acid and benzoic acid, partial

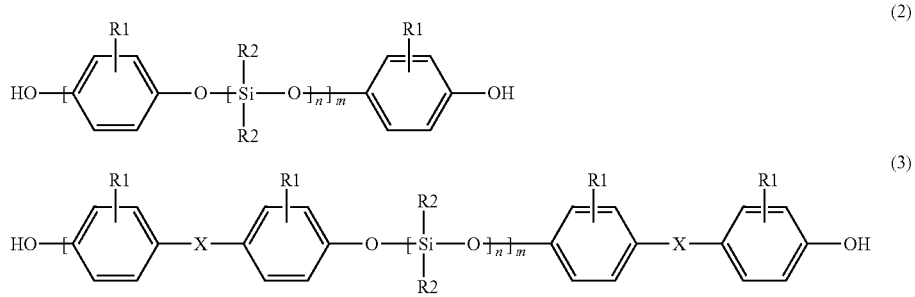

wherein R1 stands for hydrogen, Cl, Br, C1-C4 alkyl, preferably for hydrogen or methyl and especially preferably for hydrogen, R2 mutually independently stand for aryl or alkyl, preferably for methyl, X stands for a single bond, —SO2-, —CO—, —O—, —S—, C1 to C6 alkylene, C2- to C5 alkylidene or for C6 to C12 arylene, which can optionally be condensed with further aromatic rings containing hetero atoms, X preferably stands for a single bond, C1 to C5 alkylene, C2 to C5 alkylidene, C5 to C12 cycloalkylidene, —O—, —SO— —CO—, —S—, —SO2-, and X particularly preferably esters of polycarboxylic acids, such as mono- or diorgano phosphoric acid esters, branched aliphatic carboxylic acids, such as 2,2-dimethylpropanoic acid, 2,2-dimethylbutanoic acid and 2,2-dimethylpentanoic acid. Useful organic and inorganic salts are or are derived from, sodium acetate, potassium acetate, lithium acetate, sodium stearate, potassium stearate, lithium stearate, sodium oleate, lithium oleate, potassium oleate, sodium benzoate, potassium benzoate, lithium benzoate, disodium, dipotassium and dilithium salts of bisphenol A. Furthermore the salts may include calcium acetate, barium acetate, magnesium acetate, strontium acetate, calcium stearate, barium stearate, magnesium stearate, strontium stearate and the respective oleates. These salts may be used singly or in combination.

Preferred organic or inorganic salts are selected from the group consisting of alkali metal salts, (preferably sodium, potassium, cesium salts), earth alkaline metal salts, (preferably magnesium, calcium salts), quaternary ammonium salts (preferably tetra-(n-butyl)-ammonium, tetraphenylammonium, tetrabenzylammonium, cetyltrimethylammonium) and quaternary phosphonium salts ((preferably tetra-(n-butyl)-phosphonium, tetraphenylphosphonium, tetrabenzylphosphonium, cetyltrimethylphosphonium).

Most preferred are alkali metal salts and quaternary phosphonium salts salts, preferably in each case of carboxylic acids which preferably have up to 30 carbon atoms.

In a further preferred embodiment the organic or inorganic salts are selected from the group consisting of salts of weak acids having a pKA of 3 to 7, preferably 3 to 6, more preferably 3.5 to 5.5 (25° C. in water as solvent. The pKA is defined in WO 2015052229.

Component C)

Preferably, according to the present invention component C) which is selected from at least one from the group consisting of a siloxane containing aromatic substituents (component C1) and a polysiloxane-polycarbonate block cocondensate which is obtained from the reaction of at least component A) and B) or polysiloxane-polycarbonate block cocondensate, which can also be different from the product obtained from the reaction of at least component A) and B) (component C2). It is preferred that component A) and B) mentioned with respect to component C2) are selected from components A) and B) as described above.

Preferred component C1 is a linear siloxane with aromatic groups with the structure (8) or a cyclic siloxane with the structure (9) as building block:

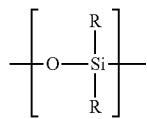

(8)

wherein R mutually independently stands for unsubstituted or singly to quadruply C1 to C4 alkyl-substituted aryl, preferably for unsubstituted or singly to triply methyl-substituted phenyl;
structure (9)

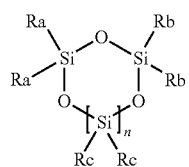

(9)

wherein Ra, Rb and Rc mutually independently stand for aryl and/or alkyl, preferably mutually independently stand for phenyl or methyl, wherein Ra, Rb and Rc in each case mean at least one, preferably in each case two, aryl or preferably phenyl and n in formula (9) is a whole number 1 to 10, preferably 1 to 5 and especially preferably 1 or 2. Especially preferable is octaphenylcyclotetrasiloxane.

As component C2, polysiloxane-polycarbonate block cocondensates, which are preferably built up of the above-mentioned polycarbonate and polysiloxane building blocks, are possible. They can be produced by the process according to the invention or by generally known processes such as the melt transesterification process, phase boundary process or reactive extrusion process. Polysiloxane-polycarbonate block cocondensates containing bisphenol A and polydimethylsiloxane or combinations of block cocondensates with polysiloxanes of the formula (8) and/or of the formula (9) are particularly preferred.

The block cocondensate here contains in particular polysiloxane of the formulae (1), (2) or (3) as the polysiloxane block and polycarbonate based on bisphenol A with phenol as preferred end group.

Furthermore, the component C2, i.e. polysiloxane-polycarbonate block cocondensate, can contain the following structural elements:

The siloxane-containing block cocondensates relate to block cocondensates with the following structural units

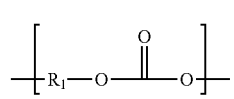

(I)

wherein R1 is a divalent substituted or unsubstituted aromatic residue, a divalent linear or cyclic aliphatic residue or the structural unit (I) is a mixture of building blocks, wherein R1 is a divalent substituted or unsubstituted aromatic residue or R1 is a divalent linear or cyclic aliphatic residue. The content of aromatic R1 residues is 60-100 wt. % and the content of aliphatic residues 0-40 wt. %, based on the sum of diphenols of the formula (III) used in wt. % and the structural unit (II)

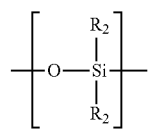

(II)

wherein R2 mutually independently are a linear or branched aliphatic residue, preferably C1-C12 alkyl, particularly preferably C1 to C4 alkyl, in particular methyl, or a substituted or unsubstituted aromatic residue, preferably phenyl.

Quite especially preferred structural units (II) are dimethylsiloxane, or diphenylsiloxane methyl/phenylsiloxane or mixtures of dimethylsiloxane and diphenylsiloxane units.

In the structural unit (1), R1 is preferably derived from dihydroxyaryl compounds which correspond to the formula (III):

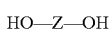

HO—Z—OH     (III)

in which

Z is an aromatic residue with 6 to 30 C atoms which can contain one or more aromatic nuclei, can be substituted and can contain aliphatic residues or alkylaryls or hetero atoms as bridging members.

Preferably Z in formula (III) stands for a residue of the formula (IIIa)

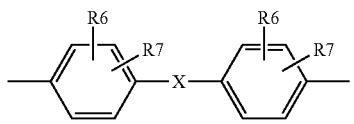

(IIIa)

in which

R6 and R7 mutually independently stand for H, C1-C18 alkyl, C1-C18 alkoxy, halogen such as Cl or Br or for in each case optionally substituted aryl or aralkyl, preferably mutually independently for H or C1-C12 alkyl, particularly preferably for H or C1-C8 alkyl and quite especially preferably mutually independently stand for H or methyl, and X stands for CO, O, S, C1 to C6 alkylene, C2 to C5 alkylidene, C6 to C10 cycloalkylidene or for C6 to C12 arylene, which can optionally be condensed with further aromatic rings containing hetero atoms.

Preferably X stands for C1 to C5 alkylene, C2 to C5 alkylidene, C6 to C9 cyclohexylidene, —O—, —SO—, —CO—, —S—, —SO2-, particularly preferably for isopropylidene, 3,3,5-trimethylcyclohexylidene or oxygen, in particular for isopropylidene.

Diphenols of the formula (III) suitable for the production of the SiCoPCs according to the invention are for example hydroquinone, resorcinol, bis-(hydroxyphenyl)alkanes, bis-(hydroxyphenyl) sulphides, bis-(hydroxyphenyl) ethers, bis-(hydroxyphenyl) ketones, bis-(hydroxyphenyl) sulphones, bis-(hydroxyphenyl) sulphoxides, [alpha],[alpha]'-bis-(hydroxyphenyl)diisopropylbenzenes, and alkylated, ring-alkylated and ring-halogenated compounds thereof.

Further preferred diphenols of the formula (III) are 4,4'-dihydroxydiphenyl, 2,2-bis-(4-hydroxyphenyl)-1-phenyl-propane, 1,1-bis-(4-hydroxyphenyl)phenylethane, 2,2-bis-(4-hydroxyphenyl)propane, 2,2-bis-(3-methyl-4-hydroxyphenyl)propane, 2,4-bis-(4-hydroxyphenyl)-2-methylbutane, 1,3-bis-[2-(4-hydroxy-phenyl)-2-propyl] benzene (bisphenol M), 2,2-bis-(3-methyl-4-hydroxyphenyl)propane, bis-(3,5-dimethyl-4-hydroxyphenyl)methane, 2,2-bis-(3,5-dimethyl-4-hydroxyphenyl)propane, bis-(3,5-dimethyl-4-hydroxyphenyl) sulphone, 2,4-bis-(3,5-dimethyl-4-hydroxyphenyl)-2-methylbutane, 1,3-bis-[2-(3,5-dimethyl-4-hydroxyphenyl)-2-propyl]benzene. 1,1-bis-(4-hydroxyphenyl)cyclohexane and 1,1-bis-(4-hydroxyphenyl)-3,3,5-trimethylcyclohexane.

Particularly preferred diphenols of the formula (III) are 2,2-bis-(4-hydroxyphenyl)propane (BPA), hydroquinone, 1,1-bis-(4-hydroxyphenyl)-3,3,5-trimethylcyclohexane and 2,2-bis-(3-methyl-4-hydroxy-phenyl)propane.

These and further suitable diphenols are commercially available and are described for example in "H. Schnell, Chemistry and Physics of Polycarbonates, Interscience Publishers, New York 1964, p. 28 ff; p. 102 ff", and in "D. G. Legrand, J. T. Bendler, Handbook of Polycarbonates Science and Technology, Marcel Dekker New York 2000, p. 72 ff.".

In one embodiment, the siloxane block can have the following structure (IV)

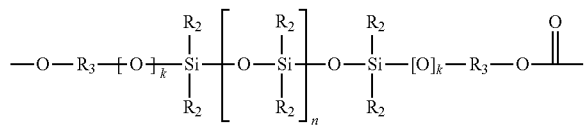

(IV)

wherein $R_2$ has the aforesaid meaning, n an average number from 10 to 400, preferably 10 to 100, particularly preferably 15 to 50, and k stands for 1 or in case e is different from 0, k stands for 0.

$R_3$ mutually independently comprises the following structural elements (V) or (VI):

(V)

wherein $R_4$ mutually independently is hydrogen, halogen and/or are each a C1 to C10, preferably C1 to C4, linear or branched, unsubstituted or singly to quadruply substituted alkyl residue or alkoxy residue, preferably the alkyl and alkoxy residue are preferably unsubstituted, and especially preferably $R_4$ is hydrogen, e is 0 or a whole number from 2 to 12, preferably 2 to 6, wherein in the case that e is equal to 0, k is equal to 1, or a structural element of the formula (VI)

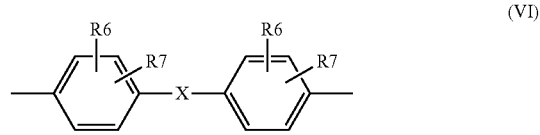

(VI)

wherein R6, R7 and X have the meanings stated with formula (IIIa).

For example and preferably, the siloxane block can contain the following structures

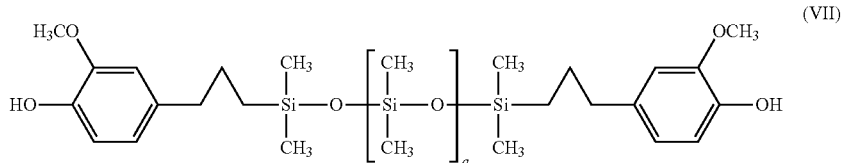

(VII)

-continued

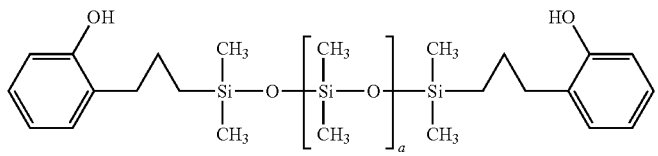
(VIII)

wherein a in formula (VII) and (VIII) stands for an average number from 10 to 400, preferably 10 to 100 and particularly preferably for 15 to 50.

In a further embodiment, the aforesaid siloxane blocks can be singly or multiply linked via terephthalic acid or isophthalic acid to give the following structural elements shown by way of example

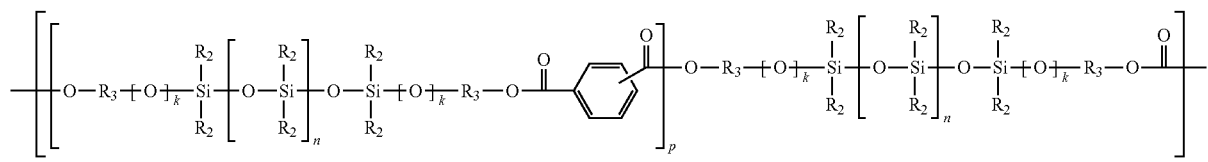
(IX)

wherein p stands for 0 or 1, and $R_2$, $R_3$, n and k have the meaning stated above with the structural element (IV).

Corresponding siloxane blocks for reaction with polycarbonate or for reaction with diphenols derived from the formula (III) or (IIIa) with phosgene or diaryl carbonates each have terminal phenolic OH groups, i.e.

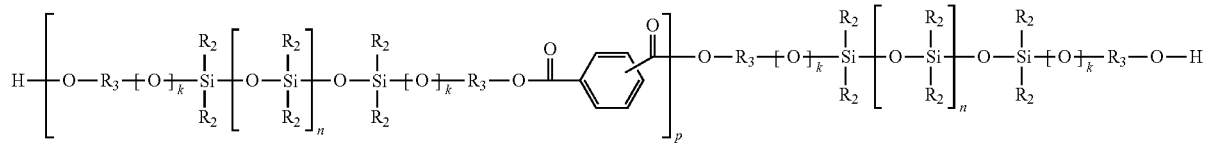
(IXa)

wherein $R_2$, $R_3$, n, k and p have the meanings stated with the structural element (IX).

In a preferred embodiment of the present invention, component C) is at least one from the group consisting of a polysiloxane-polycarbonate block cocondensate which is obtained from the reaction of at least component A) and B) or polysiloxane-polycarbonate block cocondensate, which can also be different from the product obtained from the reaction of at least component A) and B) (component C2). In this particular embodiment it is further preferred that component C) additionally comprises a siloxane containing aromatic substituents (component C1). Components C2) and C1) are preferably selected from the description of these components mentioned above.

The process according to the invention is above all characterized in that component C) is added to the reaction melt at 0.01 to 20 wt. %, preferably 0.1 to 10 wt. % and especially preferably from 0.2 to 8 wt. % based on the whole composition (sum of components A to C). As mentioned above, according to the present invention this addition requires an active step and does not include cases where component C2) is formed in situ by reaction of component A) and B). This means that the indicated wt.-% of component C) are calculated solely based on component C). This does not mean that after the addition of component C) the overall concentration of C) is or gets higher, because of the ongoing reaction of components A) and B). Preferably, the process comprises a step of adding component C) to component A), to component B) and/or to a mixture of component A) and B), wherein component C) is added to the reaction melt at 0.01 to 20 wt. %, preferably 0.1 to 10 wt. % and especially preferably from 0.2 to 8 wt. % based on the whole composition (sum of components A to C).

The addition can take place at any point in the process at any time. Preferably the component C) is added to the reaction mixture at an early time point. Especially preferably the component C) is added before addition of the component B). The component C) can for example also be melted together with the polycarbonate at the start of the reaction or be plasticized together with polycarbonate in a reactive extrusion. Here the component C) can be the siloxane-containing block cocondensate obtained according to the invention. In a reactive extrusion, one part of the block cocondensate produced can be passed back into the plasticizing unit, i.e. into the pre-reactor. Thus a part of the product stream is continuously passed back into the pre-reactor or the main reactor.

Here the component C) can be introduced directly or in the form of a masterbatch. The component C) can be mixed with other components, such as for example a catalyst—e.g. corresponding to the structure (K). As substrate material for the masterbatch, for example polycarbonate is possible, in particular polycarbonate according to component A) is mentioned.

Additives and/or fillers and reinforcing agents can be added to the polysiloxane-polycarbonate block cocondensates obtainable by the process according to the invention in quantities from 0.0 wt. % to 5.0 wt. %, preferably 0.01 wt. % to 1.00 wt. %. Possible additives are selected from at least one from the group of flame retardants, UV stabilizers, gamma stabilizers, antistatic agents, optical brighteners, flow improvers, heat stabilizers, inorganic pigments, mould release agents and processing aids.

The additives are normal polymer additives, such as for example those described in EP-A 0 839 623, WO-A 96/15102, EP-A 0 500 496 or "Plastics Additives Handbook", Hans Zweifel, 5th Edition 2000, Hanser Verlag, Munich.

These additives can be added to the polymer melt singly or in any mixtures or several different mixtures. This can be introduced into the polycarbonate directly during the isolation of the polymer (e.g. via a side system such as a side extruder) as pure substance or in the form of a masterbatch or else after melting of the polycarbonate granules in a so-called compounding step. In this, the additives or mixtures thereof can be added to the polymer melt as solid, that is as powder, or as a melt. Another type of dosing is the use of masterbatches or mixtures of masterbatches of the additives or additive mixtures.

In a preferred embodiment, the polymer composition contains heat or processing stabilizers. Preferably suitable are phosphites and phosphonites and phosphines. Examples are triphenyl phosphite, diphenyl alkyl phosphite, phenyl dialkyl phosphite, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,4-di-cumylphenyl) pentaerythritol diphosphite, bis(2,6-di-tert-butyl-4-methylphenyl) pentaerythritol diphosphite, diisodecyloxy pentaerythritol diphosphite, bis(2,4-di-tert-butyl-6-methylphenyl)-pentaerythritol diphosphite, bis(2,4,6-tris(tert-butylphenyl) pentaerythritol diphosphite, tristearylsorbitol triphosphite, tetrakis(2,4-di-tert-butylphenyl)-4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2''-nitrilo-[triethyltris(3,3',5,5'-tetra-tert-butyl-1,1'-biphenyl-2,2'-diyl)phosphite], 2-ethylhexy 1(3,3',5,5'-tetra-tert-butyl-1,1'-biphenyl-2,2'-diyl) phosphite, 5-butyl-5-ethyl-2-(2,4,6-tri-tert-butylphenoxy)-1,3,2-dioxaphosphorinan, bis(2,6-di-tert-butyl-4-methylphenyl) pentaerythritol diphosphite, triphenylphosphine (TPP), trialkylphenylphosphine, bisdiphenylphosphinoethane or a trinaphthylphosphine. Especially preferably, triphenylphosphine (TPP), Irgafos® 168 (tris(2,4-di-tert-butyl-phenyl) phosphite) and tris(nonylphenyl) phosphite or mixtures thereof are used.

Further, phenolic antioxidants such as alkylated monophenols, alkylated thioalkylphenols, hydroquinones and alkylated hydroquinones can be used. Particularly preferably, Irganox® 1010 (pentaerythritol 3-(4-hydroxy-3,5-di-tert-butylphenyl)propionate; CAS: 6683-19-8) and Irganox 1076® (2,6-di-tert-butyl-4-(octadecanoxycarbonylethyl) phenol) are used.

Suitable UV absorbers are for example described in EP 1 308 084 A1, in DE 102007011069 A1 and in DE 10311063 A1.

Particularly suitable ultraviolet absorbers are hydroxybenzotriazoles, such as 2-(3',5'-bis-(1,1-dimethyl-benzyl)-2'-hydroxyphenyl)benzotriazole (Tinuvin® 234, Ciba Specialty Chemicals, Basel), 2-(2'-hydroxy-5'-(tert.-octyl)-phenyl)benzotriazole (Tinuvin® 329, Ciba Specialty Chemicals, Basel), 2-(2'-hydroxy-3'-(2-butyl)-5'-(tert.butyl)-phenyl)benzotriazole (Tinuvin® 350, Ciba Specialty Chemicals, Basel), bis-(3-(2H-benztriazolyl)-2-hydroxy-5-tert.-octyl)methane, (Tinuvin® 360, Ciba Specialty Chemicals, Basel), (2-(4,6-diphenyl-1,3,5-triazin-2-yl)-5-(hexyloxy)phenol (Tinuvin® 1577, Ciba Specialty Chemicals, Basel), and the benzophenones 2,4-dihydroxybenzophenone (Chimassorb® 22, Ciba Specialty Chemicals, Basel) and 2-hydroxy-4-(octyloxy)benzophenone (Chimassorb® 81, Ciba, Basel), 2-propenoic acid, 2-cyano-3,3-diphenyl-, 2,2-bis[[(2-cyano-1-oxo-3,3-diphenyl-2-propenyl)oxy]-methyl]-1,3-propanediyl ester (9CI) (Uvinul® 3030, BASF AG Ludwigshafen), 2-[2-hydroxy-4-(2-ethylhexyl)oxy]phenyl-4,6-di(4-phenyl)phenyl-1,3,5-triazine (CGX UVA 006, Ciba Specialty Chemicals, Basel) or tetraethyl-2,2'-(1,4-phenylene-dimethylidene) bismalonate (Hostavin® B-Cap, Clariant AG).

Mixtures of these ultraviolet absorbers can also be used.

The polymer compositions according to the invention can optionally contain mould release agents. Particularly suitable mould release agents for the composition according to the invention are pentaerythritol tetrastearate (PETS) or glycerine monostearate (GMS).

Furthermore, other polymers can also be blended with the block cocondensates obtainable according to the invention, such as for example polyester carbonate, polystyrene, styrene copolymers, aromatic polyesters such as polyethylene terephthalate (PET), PET-cyclohexanedimethanol copolymer (PETG), polyethylene naphthalate (PEN), polybutylene terephthalate (PBT), cyclic polyolefin, poly- or copolyacrylates and poly- or copolymethacrylate such as for example poly- or copolymethyl methacrylate (such as PMMA) and copolymers with styrene such as for example transparent polystyrene-acrylonitrile (PSAN), thermoplastic polyurethanes, and polymers based on cyclic olefins (e.g. TOPAS®, a commercial product from Ticona).

Preferably, according to the present invention a process is provided, wherein
50.0 to 0.5 wt. % of polycarbonate according to component A) is used with
0.5 to 50.0 wt. % of hydroxyaryl-terminated polysiloxane according to component B) based on the content of A) and B).

More preferably, according to the present invention a process is provided, wherein
98.0 to 80.0 wt. % polycarbonate according to component A) is used with
2.0 to 20.0 wt. % hydroxyaryl-terminated polysiloxane according to component B) based on the content of A) and B).

In another aspect of the present invention, a composition is provided comprising at least one polysiloxane-polycarbonate block cocondensate and at least one siloxane containing aromatic substituents (component C1). Preferably, the at least one polysiloxane-polycarbonate block cocondensate is formed by reaction of component A) and B) according to the present invention. Preferably, this composition is obtained by the process of the present invention. In some embodiments of the present invention, the composition can further comprise at least one polysiloxane-polycarbonate block cocondensate which is different from the product obtained from the reaction of at least component A) and B).

In a further aspect of the present invention a use of a compound is provided, wherein the compound is selected from at least one from the group consisting of a siloxane containing aromatic substituents (component C1) and a polysiloxane-polycarbonate block cocondensate (component C2) for reducing the particle size distribution of the siloxane domains in a polysiloxane-polycarbonate block cocondensate in the process for the production of said polysiloxane-polycarbonate block cocondensate. According to the present invention it has been surprisingly found that compounds such as C1) and/or C2), preferably, C2) or a mixture of C2) and C1), can influence the particle size of the siloxane domains in a polysiloxane-polycarbonate block cocondensate. Accordingly, compounds as C1) and/or C2), preferably, C2) or a mixture of C2) and C1), positively influence the processing properties of a polysiloxane-polycarbonate block cocondensate.

The block cocondensates obtainable by the process according to the invention can be processed into any moulded objects in the manner known for thermoplastic polycarbonates.

In this connection, the compositions according to the invention can be converted into products, moulded bodies or moulded objects (summarized as moulded components) for example by hot press moulding, spinning, blow moulding, deep-drawing, extrusion or injection moulding. Also of interest is their use in multilayer systems. The application of the composition obtainable according to the invention can for example be used in multicomponent injection moulding or as substrate for a coex layer. The application can however also be effected onto the moulded base body, e.g. by lamination with a film or by coating with a solution.

Plates and moulded bodies formed of a base layer and an optional covering layer/optional covering layers (multilayer systems) can be produced by (co)extrusion, direct skinning, direct coating, insert moulding, film back-moulding or other suitable process known to those skilled in the art.

The polysiloxane-polycarbonate-block cocondensates obtainable by the process according to the invention are usable everywhere where the known aromatic polycarbonates have hitherto been used and where in addition good flowability coupled with improved mould release behaviour and high toughness at low temperatures and improved chemicals resistance are necessary, such as for example for the production of large exterior vehicle parts and switch boxes for outside use, of plates, hollow chamber plates, parts for electrical and electronic equipment and optical memories. Thus the block cocondensates can be used in the IT field for computer housings and multimedia housings, mobile telephone covers and in the domestic field such as in washing machines or dishwashers, and in the sports field, e.g. as material for helmets.

Practical Examples

Below, the invention is described in more detail on the basis of practical examples, wherein the determination processes described here are used for all corresponding quantities in the present invention provided that nothing to the contrary has been described.

MVR

The determination of the melt volume rate (MVR), unless otherwise stated, is effected according to ISO 1133 (year 2011) (at 300° C.; 1.2 kg) provided that no other conditions have been described.

Solution Viscosity

Determination of the solution viscosity: the relative solution viscosity ($\eta$rel; also referred to as eta rel) was determined in dichloromethane at a concentration of 5 g/l at 25° C. with an Ubbelohde viscometer.

Assessment of the Siloxane Domain Size by Atomic Force Microscopy (AFM)

The siloxane domain size and distribution was determined by atomic force microscopy. For this, the relevant sample (in the form of a melt cake in laboratory systems or granules in extrusion systems) is cut up at low temperature (nitrogen cooling) by means of an ultramicrotome. A Bruker D3100 AFM microscope is used. The AFM image was recorded at room temperature (25° C., 30% relative humidity). For the measurement, the "Soft Intermittent Contact Mode" or the "Tapping Mode" was used. For scanning the sample a "Tapping Mode Cantilever" (Nanoworld point probe) with a spring constant of 2.8 $Nm^{-1}$ and a resonance frequency of ca. 75 kHz was used. The tapping force is controlled via the ratio of target amplitude and free oscillation amplitude (amplitude of the probe tip on free oscillation in air). The sampling rate was set at 1 Hz. For recording the surface morphology, phase contrast and topography images were recorded on a 2.5 $\mu$m×2.5 $\mu$m area. The particles or siloxane domains were automatically assessed by Olympus SIS image assessment software (Olympus Soft Imaging Solutions GmbH, 48149, Munster, Germany) via light-dark contrast (from the phase contrast images). The diameters of the particles were determined via the diameter of the corresponding equal area circle.

Several phase contrast images (number of particles greater than 200) are assessed as described above. The individual diameters are classified via the imaging software and a diameter distribution generated. The assignment to the individual D values is effected with this. The D value gives the percentage of particles which less than the stated value. With a D90 value of x, 90% of the particles are smaller than x. Further, the percentage of the particles which are smaller than 100 mm is determined from the distribution.

Starting Materials

Component A: Polycarbonate

PC 1:

As the starting material for the reactive extrusion, linear bisphenol-A polycarbonate with phenol-based groups from Covestro Deutschland AG with a melt volume index of 59-62 $cm^3$/10 min measured at 300° C. and 1.2 kg loading (according to ISO 1033) is used. This polycarbonate contains no additives such as UV stabilizers, mould release agents or heat stabilizers. The production of the polycarbonates was effected by a melt transesterification process as described in DE 102008019503. The polycarbonate has a content of phenolic end groups of ca. 600 ppm.

Component B: Siloxane

Siloxane-1:

Bisphenol A-terminated polydimethylsiloxane of the formula 3 with n ca. 20 and m in the range from 3 to 4 ($R^1$=H, $R^2$; X=isopropylidene), with a hydroxy content of 26.2 mg KOH/g and a viscosity of 366 mPa·s (23° C.); the sodium content is 2.9 ppm.

Siloxane-2:

Hydroquinone-terminated polydimethylsiloxane with n ca. 20 and m in the range from 3 to 4 in formula (2) ($R^1$=H, $R^2$), with a hydroxy content of 20.8 mg KOH/g and a viscosity of 191 mPa·s (23° C.); the sodium content is 4.9 ppm.

Siloxane-3:

Hydroquinone-terminated polydimethylsiloxane with n ca. 20 and m in the range from 3 to 4 in formula (2) ($R^1$=H, $R^2$), with a hydroxy content of 22.2 mg KOH/g and a viscosity of 175 mPa·s (23° C.); the sodium content is ca. 3 ppm.

The production of the siloxanes is for example described in U.S. Pat. No. 8,912,290.

Catalyst Masterbatch (without siloxane-based added component):

As the catalyst, tetraphenylphosphonium phenolate from Rhein Chemie Rheinau GmbH (Mannheim, Germany) is used in the form of a masterbatch. Tetraphenylphosphonium phenolate is used as a solid solution with phenol and contains ca. 70% tetraphenylphosphonium phenolate. The following quantities relate to the substance obtained from Rhein Chemie (as solid solution with phenol).

The masterbatch is produced as a 0.25% mixture. For this, 4982 g of polycarbonate PC1 is tumbled with 18 g of tetraphenylphosphonium phenolate in the drum hoop mixer for 30 minutes. The masterbatch is introduced in the ratio 1:10, so that in the whole quantity of polycarbonate the catalyst is present in a content of 0.025 wt. %.

Component C:

Component C2-1:

Polysiloxane-polycarbonate block cocondensate containing polysiloxane based on above-described structure according to formula (2)

Production of Component C2-1:

The diagram of the experimental set-up can be seen in FIG. 1.

FIG. 1 shows a diagram for the production of the siloxane-containing block cocondensates. Polycarbonate (component A)) and the catalyst masterbatch (see below) are metered in via the gravimetric feeds (4) and (5) onto the double-screw extruder (1). The extruder (Type ZSE 27 MAXX from Leistritz Extrusionstechnik GmbH, Nuremberg) is a corotating double-screw extruder with vacuum zones for removal of the vapours. The extruder consists of 11 housing parts (a to k) —see FIG. 1. In housing part a, the addition of polycarbonate and catalyst masterbatch takes place and in the housing b and c the melting of these components. In housing part d, the addition of the liquid siloxane component (component B) takes place. The housing parts e and f serve for the admixture of the liquid siloxane component (component B). The housing parts g, h, i and j are provided with venting openings in order to remove the condensation products. The housing parts g and h are assigned to the first vacuum stage and the housing parts i and j to the second. The vacuum in the first vacuum stage was between 250 and 500 mbar absolute pressure. The vacuum in the second vacuum stage is less than 1 mbar. The siloxane (component B) is stocked in a tank (6) and fed into the extruder via a metering pump (7). The vacuum is generated via 2 vacuum pumps (8). The vapours are passed away from the extruder and trapped in 2 condensers (9). The melt thus degassed in passed via a pipe from the housing part k of the double-screw extruder to a high-viscosity reactor (2).

The high-viscosity reactor (2) is a self-cleaning device with two contrarotating rotors arranged horizontally and with parallel axes. The design is described in European patent application EP0460466, see FIG. 7 therein. The machine used has a rotor diameter of 187 mm with a length of 924 mm. The total internal space of the reactor has a volume of 44.6 litres. The high-viscosity reactor is also connected to a vacuum pump (8) and to a condenser (9). The vacuum present on the high-viscosity reactor is 0.1 to 5 mbar. After completion of the reaction, the block cocondensate is discharged via a discharge screw and then granulated (via water bath (10) and granulator (11)).

The block cocondensate was produced with the following process parameters:

As the polycarbonate, the polycarbonate PC-1 was used as described above. As the siloxane, siloxane-3 was used. The feed rate of the polycarbonate component is 62 kg/h, the feed rate of the siloxane component is 3.1 kg/h. The extruder temperature is 350° C. and the temperature in the high-viscosity reactor 350° C. An opaque-white granulate with a solution viscosity of 1.306 is obtained.

The process is described in more detail in WO 2015/052110.

Component C1 According to Structure (9):

Octaphenylcyclotetrasiloxane (CAS: 546-56-5), 95% from ABCR GmbH & Co. KG (Karlsruhe Germany).

Component C2-2 Containing Structural Elements According to Structure (IX):

Siloxane-containing block cocondensate with the trade name Trirex ST6-3022PJ from Samyang Corp. Korea, containing ca. 9% polydimethylsiloxane; block cocondensate containing bisphenol A-based polycarbonate and siloxanes according to structure (IX).

Example 1 (Comparative Example; Process without Component C)

42.5 g of polycarbonate granules (PC-1; 85 wt. %), 2.5 g of siloxane-1 (5 wt. %) and 5 g (10 wt. %) of catalyst masterbatch are weighed out into a 250 ml glass flask with stirrer and molecular still separator. The apparatus is evacuated and flushed with nitrogen (3× each time). The mixture is melted under vacuum within 10 minutes by a metal bath preheated to 350° C. The pressure in the apparatus is ca. 1.5 mbar. The reaction mixture is kept under this vacuum for 30 minutes with stirring. The system is then flushed with nitrogen and the polymer melt removed. An opaque-white polymer is obtained. The solution viscosity of the product is eta rel=1.439.

Example 2 (Example According to the Invention; Process with Component C)

37.5 g of polycarbonate granules (PC-1; 75 wt. %), 2.5 g of siloxane-1 (5 wt. %), 5 g (10 wt. %) of catalyst masterbatch and 5 g (10 wt. %) of component C2-1 are weighed out into a 250 ml glass flask with stirrer and molecular still separator. The apparatus is evacuated and flushed with nitrogen (3× each time). The mixture is melted within 10 minutes under vacuum by a metal bath preheated to 350° C. The pressure in the apparatus is ca. 1.5 mbar. The reaction mixture is kept under this vacuum for 30 minutes with stirring. The system is then flushed with nitrogen and the polymer melt removed. An opaque-white polymer is obtained. The solution viscosity of the product is eta rel=1.470.

TABLE 1

| | Particle size distribution | |
| --- | --- | --- |
| Example | Particle distribution; D90 value of average particle diameter [nm] | Content of particles < 100 nm [%] |
| 1 (comparison) | 202.9 | 77.3 |
| 2 (according to invention) | 133.5 | 86.6 |

The particle size distribution of the siloxane domains according to Table 1 shows a marked advantage when the siloxane-based added component is used. The content of particles with a diameter of less than 100 nm is higher and the D90 value markedly lower. Moreover, it can be seen that the active addition of a polysiloxane-polycarbonate block cocondensate in example 2 results in a more favourable particle distribution than the in situ formation of a polysiloxane-polycarbonate block cocondensate in example 1.

Example 3 (Comparative Example; without Component C)

42.5 g of polycarbonate granules (PC 1; 85 wt. %), and 5 g (10 wt. %) of catalyst masterbatch are weighed out into a 250 ml glass flask with stirrer and molecular still separator. The apparatus is evacuated and flushed with nitrogen (3× each time). The mixture is melted within 10 minutes at 50 mbar by a metal bath preheated to 350° C. After complete melting the system is ventilated and 2.5 g of siloxane-2 (5 wt. %) added thereto while passing nitrogen. The apparatus is now again evacuated to 50 mbar and the reaction mixture is mixed for 2 mins at greatly increased stirrer speed. The pressure in the apparatus is then lowered to ca. 1.5 mbar and the stirrer speed reduced depending on the viscosity increase of the reaction mixture. The reaction mixture is kept under this vacuum for 20 minutes with stirring. The system is then flushed with nitrogen and the polymer melt removed. An opaque-white polymer is obtained. The solution viscosity of the product is eta rel=1.335.

Example 4 (Example According to the Invention; with Component C1 and Component C2-1)

37.5 g of polycarbonate granules (PC 1; 75 wt. %), and 5 g (10 wt. %) of catalyst masterbatch and 5 g of component C2-1 (10 wt. %) and 0.105 g of component C1 (0.2 wt. %) are weighed out into a 250 ml glass flask with stirrer and molecular still separator. The apparatus is evacuated and flushed with nitrogen (3× each time). The mixture is melted within 10 minutes at 50 mbar by a metal bath preheated to 350° C. After complete melting, the system is ventilated and 2.5 g of siloxane-2 (5 wt. %) added thereto while passing nitrogen. The apparatus is now evacuated again to 50 mbar and the reaction mixture mixed for 2 mins at markedly increased stirrer speed. The pressure in the apparatus is then lowered to ca. 1.5 mbar and the stirring speed reduced depending on the viscosity increase of the reaction mixture. The reaction mixture is kept under this vacuum for 20 minutes with stirring. The system is then flushed with nitrogen and the polymer melt removed. An opaque-white polymer is obtained. The solution viscosity of the product is eta rel=1.540.

Example 5 (Example According to the Invention; Process with Component C2-2)

37.5 g of polycarbonate granules (PC-1; 75 wt. %), 5 g of component C2-2 (10 wt. %) and 5 g (10 wt. %) of catalyst masterbatch are weighed out into a 250 ml glass flask with stirrer and molecular still separator. The apparatus is evacuated and flushed with nitrogen (3× each time). The mixture is melted within 10 minutes at 50 mbar by a metal bath preheated to 350° C. After complete melting, the system is ventilated and 2.5 g of siloxane-2 (5 wt. %) added thereto while passing nitrogen. The apparatus is now again evacuated to 50 mbar and the reaction mixture mixed for 2 mins at greatly increased stirring speed. The pressure in the apparatus is then lowered to ca. 1.5 mbar and the stirring speed reduced depending on the viscosity increase of the reaction mixture. The reaction mixture is kept under this vacuum for 20 minutes with stirring. The system is then flushed with nitrogen and the polymer melt removed. An opaque-white polymer is obtained. The solution viscosity of the product is eta rel=1.432.

TABLE 2

| | Particle size distribution | |
|---|---|---|
| Example | Particle distribution; D90 value of average particle diameter [nm] | Content of particles < 100 nm [%] |
| 3 (comparative) | 167.6 | 54.9 |
| 4 (according to invention) | 130.6 | 81.8 |
| 5 (according to invention) | 154.2 | 74.5 |

It can be seen in Table 2 that under the chosen experimental conditions the formulations which contain the component C have a markedly higher content of small siloxane domains. Accordingly, the D90 value for these formulations is low in comparison to the comparison formulation.

Example 6 (Comparative Example; Process without Component C)

The experiment is in principle performed as described in "Production of component C2-1". In contrast thereto, the component B siloxane-3 is used, which is metered in the extruder. The process parameters were adopted unchanged. Opaque-white granules are obtained with a solution viscosity of 1.306.

Example 7 (Example According to Invention Component C1 and C2-1

The experiment is in principle performed as described in "Production of the siloxane-based additional component-1". In contrast thereto, the component B siloxane-3 is used, which is metered in the extruder. The feed rate of the polycarbonate component is 60 kg/h, the feed rate of the component B is 3.0 kg/h. The feed rate of the masterbatch containing component C (i.e. C1 and C2-1 see below) and tetraphenylphosphonium phenolate is 3 kg/h. The extruder temperature is 350° C. and the temperature in the high-viscosity reactor 350° C. Opaque-white granules with a solution viscosity of 1.312 are obtained.

Composition of the masterbatch containing component C:
80% component C2-1
1.7% component C1
0.25% tetraphenylphosphonium phenolate (component C4)
18.05% PC-1 (component C3)

TABLE 3

| | melt stability | |
|---|---|---|
| | Ex. 6 (Comp.) | Ex. 7 (according to invention) |
| MVR 300° C./5 mins | 6.9 | 5.6 |
| MVR 300° C./20 mins | 5.9 | 5.5 |
| ΔMVR (300° C.) | 1.0 | 0.1 |
| MVR 320° C./5 mins | 10.2 | 9.9 |
| MVR 320° C./20 mins | 9.4 | 9.5 |
| ΔMVR (320° C.) | 0.8 | 0.4 |

It can be seen in Table 3 that the melt viscosity in Example 7 with the composition according to the invention is markedly higher in comparison to Comparative Example 6. This was surprising, since those skilled in the art might have expected that the melt stability decreases due to additional components.

TABLE 4

| | Particle size distribution: | |
|---|---|---|
| Example | Particle distribution; D90 value of average particle diameters [nm] | Content of particles < 100 nm [%] |
| 6 (Comparison) | 138 | 72.5 |
| 7 (According to invention) | 102.2 | 89.0 |

It can be seen in Table 4 that in Example 7 according to the invention the content of particles with a diameter of <100 nm is markedly higher in comparison to Comparative Example 6. Also, the D90 value is significantly lower.

The invention claimed is:

1. Process for the production of polysiloxane-polycarbonate block cocondensates, utilizing
   A) at least one polycarbonate,
   B) at least one hydroxyaryl-terminated polysiloxane, and
   C) at least one additive selected from the group consisting of a siloxane containing aromatic substituents (component C1) and a polysiloxane-polycarbonate block cocondensate which is obtained from the reaction of at least component A) and B) or polysiloxane-polycarbonate block cocondensate, which can also be different from the product obtained from the reaction of at least component A) and B) (component C2); said process comprising:
   1) adding component C) to component A), to component B), or to a mixture of component A) and B); then
   2) reacting component A) with component B) in a melt.

2. Process according to claim 1, wherein component B) is a hydroxyaryl-terminated (poly)siloxane of the formula (1),

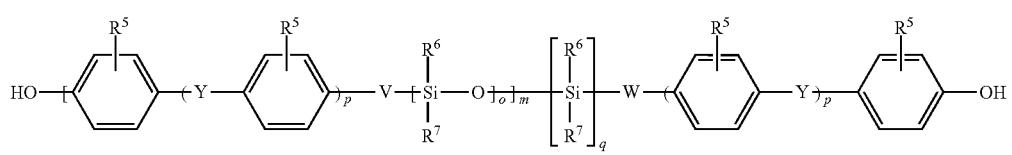

(1)

wherein
R$^5$ stands for hydrogen or C1 to C4 alkyl,
R$^6$ and R$^7$ mutually independently stand for C1 to C4 alkyl,
Y stands for a single bond, —CO—, —O—, C1 to C$_5$ alkylene, C$_2$ to C$_5$ alkylidene or for a C$_5$ to C$_6$ cycloalkylidene residue, which can be singly or multiply substituted with C$_1$ to C$_4$ alkyl,
V stands for oxygen, C1-C6 alkylene or C2 to C5 alkylidene,
W stands for a single bond, oxygen, C1 to C6 alkylene or C2 to C5 alkylidene, wherein W is not a single bond if q stands for 1, and if q is 0 then W is not oxygen,
p and q mutually independently each stand for 0 or 1,
o stands for an average number of repeating units from 10 to 400, and
m stands for an average number of repeating units from 1 to 6.

3. Process according to claim 1, wherein component B) is a hydroxyaryl-terminated (poly)siloxane of the formulae (2) or (3):

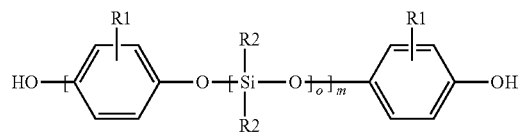

(2)

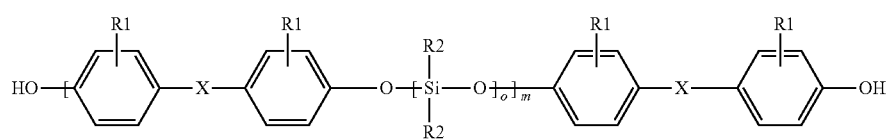

(3)

wherein R1 stands for hydrogen, Cl, Br, C1-C4 alkyl,
R2 independently stands for aryl or alkyl,
X stands for a single bond, C1 to C5 alkylene, C2 to C5 alkylidene, C5 to C12 cycloalkylidene, —O—, —SO—, —CO—, —S—, —SO2-,
n is a number between 10 and 150, and
m stands for a number from 1 to 10.

4. Process according to claim 1, wherein component C) is a linear siloxane with aromatic groups with the structure (8) or a cyclic siloxane with the formula (9)
Structure (8):

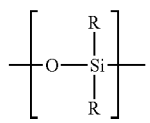

(8)

wherein R mutually independently stands for unsubstituted or singly to quadruply C1 to C4 alkyl-substituted aryl;

Structure (9):

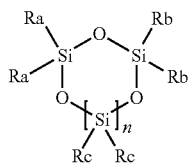

(9)

wherein Ra, Rb and Rc mutually independently stand for at least one residue selected from the group consisting of aryl and alkyl, and n is a whole number from 1 to 10.

5. Process according to claim 1, wherein the siloxane block is derived from the following structure:

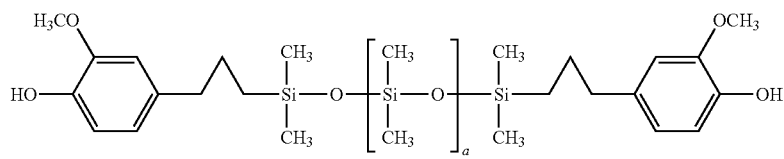

(VII)

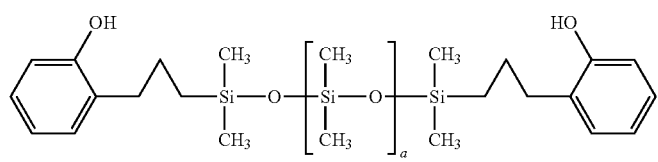

(VIII)

wherein $R_4$ mutually independently stands for hydrogen, halogen and/or in each case a C1 to C10 alkyl and e is a whole number from 2 to 12.

6. Process according to claim 1, wherein component C is a masterbatch containing
0.5 to 99.9 parts by weight of component C1 and/or C2
0.1 to 99.5 parts by weight of polycarbonate as component C3 and
0 to 1 parts by weight of a phosphonium catalyst as component C4.

7. Process according to claim 1, wherein component C) is present in the reaction melt in a quantity of 0.01 to 20 wt. %, based on the whole composition (sum of component A to C).

8. Process according to claim 1, wherein component C) is present in the reaction melt in a quantity of 0.1 to 10 wt. %, based on the whole composition (sum of component A to C).

9. Process according to claim 1, wherein component C) is present in the reaction melt in a quantity of 0.2 to 8 wt. %, based on the whole composition (sum of component A to C).

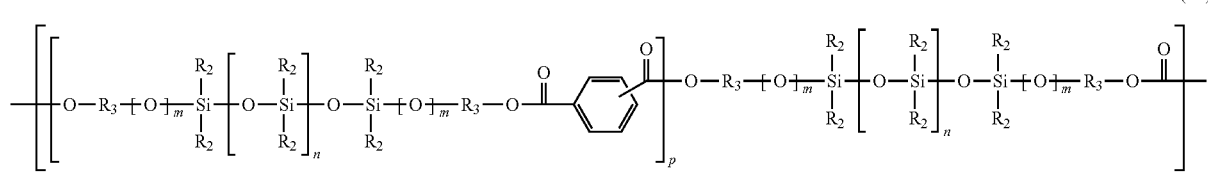

(IX)

wherein p stands for 1 to 5,
$R_2$ independently stands for aryl or alkyl,
n stands for an average number from 10 to 150,
m stands for a number from 1 to 10,
a stands for an average number from 10 to 400, and
$R_3$ mutually independently comprises the following structures

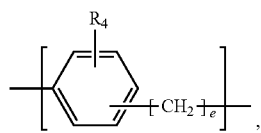

(V)

10. Process according to claim 1, wherein component C) is added to the component A) before addition of the component B).

11. Process according to claim 1, wherein component C) is melted together with the polycarbonate or in the case of a reactive extrusion is plasticized together with the polycarbonate of component A).

12. Process according to claim 1, wherein
50.0 to 0.5 wt. % of polycarbonate according to component A) is used with
0.5 to 50.0 wt. % of hydroxyaryl-terminated polysiloxane according to component B) based on the content of A) and B).

* * * * *